(12) United States Patent
Anderson et al.

(10) Patent No.: US 12,096,052 B2
(45) Date of Patent: Sep. 17, 2024

(54) ENGAGEMENT TRACKING IN COMPUTER DATA NETWORKS

(71) Applicant: Tealium Inc., San Diego, CA (US)

(72) Inventors: Michael Anderson, Carlsbad, CA (US); Craig Rouse, Reading (GB)

(73) Assignee: Tealium Inc., San Diego, CA (US)

( * ) Notice: Subject to any disclaimer, the term of this patent is extended or adjusted under 35 U.S.C. 154(b) by 143 days.

(21) Appl. No.: 17/816,618

(22) Filed: Aug. 1, 2022

(65) Prior Publication Data

US 2023/0056362 A1 Feb. 23, 2023

Related U.S. Application Data

(63) Continuation of application No. 17/396,521, filed on Aug. 6, 2021, now Pat. No. 11,405,670, which is a continuation of application No. 16/442,287, filed on Jun. 14, 2019, now Pat. No. 11,089,344, which is a continuation of application No. 16/162,254, filed on Oct. 16, 2018, now Pat. No. 10,327,018.

(60) Provisional application No. 62/573,544, filed on Oct. 17, 2017.

(51) Int. Cl.
| | |
|---|---|
| *H04N 21/2387* | (2011.01) |
| *H04L 43/10* | (2022.01) |
| *H04L 65/612* | (2022.01) |
| *H04N 21/235* | (2011.01) |
| *H04N 21/442* | (2011.01) |

(52) U.S. Cl.
CPC ......... *H04N 21/2387* (2013.01); *H04L 43/10* (2013.01); *H04L 65/612* (2022.05); *H04N 21/44204* (2013.01); *H04N 21/44222* (2013.01); *H04N 21/2353* (2013.01)

(58) Field of Classification Search
CPC ......... H04N 21/2387; H04N 21/44204; H04N 21/2353; H04L 43/10; H04L 65/612
See application file for complete search history.

(56) References Cited

U.S. PATENT DOCUMENTS

| | | |
|---|---|---|
| 8,805,946 B1 | 8/2014 | Glommen et al. |
| 8,843,827 B2 | 9/2014 | Koo et al. |
| 8,904,278 B1 | 12/2014 | Anderson et al. |
| 8,990,298 B1 | 3/2015 | Anderson |
| 9,081,789 B2 | 7/2015 | Anderson |
| 9,112,825 B2 | 8/2015 | Liu et al. |
| 9,116,608 B2 | 8/2015 | Koo et al. |
| 9,313,287 B2 | 4/2016 | Glommen et al. |
| 9,357,023 B2 | 5/2016 | Glommen et al. |
| 9,363,311 B1 | 6/2016 | McWilliams et al. |
| 9,479,609 B2 | 10/2016 | Anderson |
| 9,537,964 B2 | 1/2017 | Glommen et al. |
| 9,635,100 B2 | 4/2017 | McWilliams et al. |

(Continued)

*Primary Examiner* — Michael R Telan
(74) *Attorney, Agent, or Firm* — Knobbe, Martens, Olson & Bear, LLP

(57) ABSTRACT

An improved approach to tracking media playback includes tracking logic that is based on abandonment indicators. An abandonment indicator is detected during media playback, such as a user interaction with a computing device that is detected prior to ceasing playback of the media content. Tracking messages are reduced, suppressed, or suspended until an abandonment indicator is detected. After an abandonment indicator is detected, the system quickens, releases, or restart sending tracking messages to a collection system.

18 Claims, 12 Drawing Sheets

(56) References Cited

U.S. PATENT DOCUMENTS

| | | |
|---|---|---|
| 9,690,868 B2 | 6/2017 | Anderson |
| 9,753,898 B1 | 9/2017 | Glommen et al. |
| 9,769,252 B2 | 9/2017 | Glommen et al. |
| 9,787,795 B2 | 10/2017 | Anderson |
| 9,807,184 B1 | 10/2017 | Slovak et al. |
| 10,003,639 B2 | 6/2018 | McWilliams et al. |
| 10,078,708 B2 | 9/2018 | Slovak |
| 10,110,690 B2 | 10/2018 | Slovak et al. |
| 10,133,709 B2 | 11/2018 | Glommen et al. |
| 10,187,456 B2 | 1/2019 | Glommen et al. |
| 10,241,986 B2 | 3/2019 | Anderson et al. |
| 10,268,657 B2 | 4/2019 | Kirk et al. |
| 10,282,383 B2 | 5/2019 | Anderson |
| 10,327,018 B2 | 6/2019 | Anderson et al. |
| 10,356,191 B2 | 7/2019 | Glommen et al. |
| 10,432,701 B2 | 10/2019 | McWilliams et al. |
| 10,476,977 B2 | 11/2019 | Slovak et al. |
| 10,484,498 B2 | 11/2019 | Anderson |
| 10,635,853 B2 | 4/2020 | Glommen et al. |
| 10,817,664 B2 | 10/2020 | Anderson et al. |
| 10,831,852 B2 | 11/2020 | Anderson |
| 10,834,175 B2 | 11/2020 | Glommen et al. |
| 10,834,216 B2 | 11/2020 | Slovak et al. |
| 10,834,225 B2 | 11/2020 | Anderson |
| 10,951,687 B2 | 3/2021 | McWilliams et al. |
| 10,990,641 B2 | 4/2021 | Kirk et al. |
| 11,089,344 B2 | 8/2021 | Anderson et al. |
| 11,095,735 B2 | 8/2021 | Gavin et al. |
| 11,140,233 B2 | 10/2021 | Glommen et al. |
| 11,146,656 B2 | 10/2021 | Rouse et al. |
| 11,281,845 B2 | 3/2022 | Glommen et al. |
| 11,310,327 B2 | 4/2022 | Slovak et al. |
| 11,314,815 B2 | 4/2022 | Slovak |
| 11,347,824 B2 | 5/2022 | Anderson |
| 2012/0079523 A1* | 3/2012 | Trimper ............... A61N 5/0618 725/116 |
| 2012/0278331 A1 | 11/2012 | Campbell et al. |
| 2014/0181851 A1 | 6/2014 | Givon et al. |
| 2014/0320673 A1 | 10/2014 | Agrawal et al. |
| 2016/0261915 A1 | 9/2016 | Niebres et al. |

\* cited by examiner

ENGAGEMENT TRACKING IN COMPUTER DATA NETWORKS

RELATED APPLICATIONS

Any and all applications for which a domestic priority claim is identified in the Application Data Sheet as filed with the present application are hereby incorporated by reference under 37 CFR 1.57.

BACKGROUND

Some content providers, such as websites and media streaming services, can obtain the results of analytics regarding engagements or views of their content. User analytics can include any type of data regarding engagements or views of content from the content providers, among other types of data. There are different approaches to gathering analytics data, which include using tracking messages or employing the use of tags.

BRIEF DESCRIPTION OF THE DRAWINGS

Throughout the drawings, reference numbers are re-used to indicate correspondence between referenced elements. The drawings are provided to illustrate embodiments of the features described herein and not to limit the scope thereof.

DETAILED DESCRIPTION

I. Engagement Tracking Introduction

Figure 1:
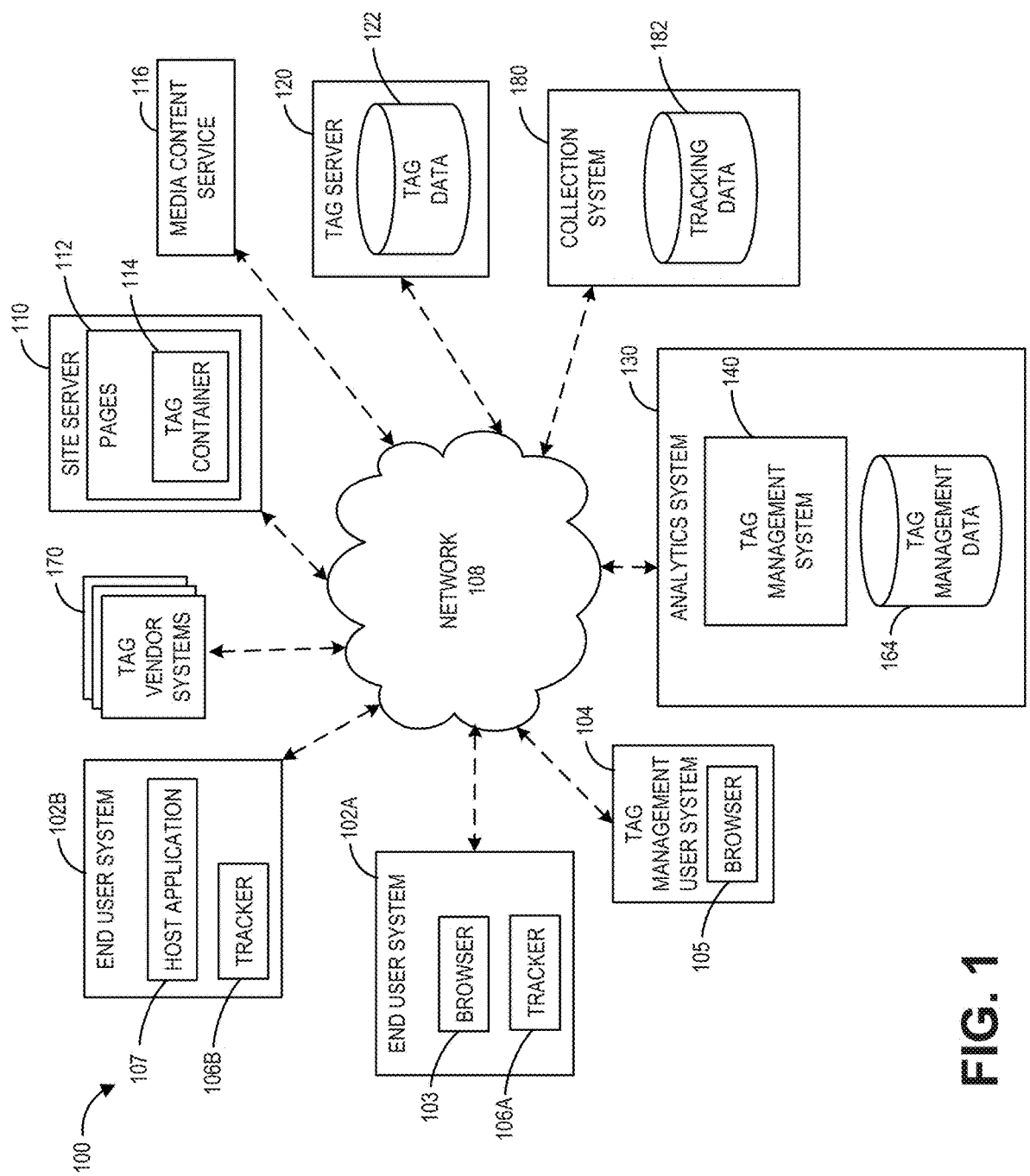
FIG. 1 depicts an embodiment of a computing environment that provides access to an analytics system that includes a tag management system.

Some content providers are interested in how much of a video a user has watched. For example, sometimes a user does not watch the entire video and some content providers are interested in how much of the partially-watched video the user consumed. Tracking systems and solutions can be used to monitor how much of a media item, such as a video, a user has consumed. Such tracking systems can be embedded within media playback applications. During media playback, the tracking systems can send tracking messages to a collection system that maintains the tracking data.

Tracking of media content playback may be difficult because a user can abruptly cease playback of media content. For example, during media playback, a user can close a media playback application or otherwise kill a media playback process. Such abrupt cancellations can prohibit the media playback application or process from sending a tracking message to the collection system. Some traditional systems for tracking consumption of video content send tracking messages at regular intervals during video playback to address this issue of abrupt cancellations. Some tracking systems preemptively send a tracking message to a collection system, such as at the regular interval, before the abrupt cancellation. Sending tracking messages at intervals may be referred to as heartbeat tracking. However, disadvantages of heartbeat tracking can include increased bandwidth usage, increased battery usage, or increased usage of computing resources due to the regular intervals that the heartbeat tracking messages are generated and sent.

An aspect of at least one of the inventions disclosed herein includes the realization that tracking message intervals can be strategically changed so as to decrease bandwidth usage, decrease battery usage, or decrease the usage of computing resources. An improved approach to tracking media playback can include tracking logic that is based on the assumption that there are indicators that can be detected, which indicate an increased likelihood that a user will proximately cease consuming media content and that until such indicators are detected, tracking messages can be suppressed.

The present disclosure describes embodiments, systems, methods, and non-transitory computer readable media that can efficiently track user consumption of media content. In some situations, a user may consume media content by passively viewing or listening to the content without interacting with the media playback device. Such lack of interaction during media playback may be common for certain types of media content, such as video content. For example, a user may sit back and watch video content without physically interacting with a mouse, keyboard, touchscreen, or other input device associated with a computing device.

In some embodiments, an abandonment indicator can be detected during media playback, such as a user interaction with a computing device that is detected prior to ceasing playback of the media content. Tracking messages can be reduced, suppressed, or suspended until an abandonment indicator is detected. After an abandonment indicator is detected, the system can quicken, release, or restart sending tracking messages to a collection system.

As used herein, in addition to its ordinary meaning, an "abandonment indicator" refers to a type of event detected in association with a computing device that is indicative of a likely or imminent abandonment of media playback. Example abandonment indicators include events that correspond to touch input (such as a swipe by a user on a touch screen), movement of a computing device, movement of an input device (such as a mouse), keyboard input, interaction with an application (such as an intelligent personal assistant application), button selections (such as a home button push), voice input, or camera input. An input device of a computing device, such as an input sensor, can generate output that can be determined to constitute an abandonment indicator. Example input devices include a touch screen, a keyboard, a mouse, a gyroscope, an accelerometer, a magnetometer, a camera, or a microphone. In the context of a user consuming media content for an extended period of time, any input in any one of the devices could be first step of the user in terminating the media playback. Thus, any user input can be considered as an abandonment indicator.

As used herein, in addition to its ordinary meaning, "suppression" or "suppressing" of tracking messages refers to reducing, stopping, or suspending the preparation or transmission of one or more tracking messages. For example, suppressing tracking messages can include lowering a rate of transmitting tracking messages. In some embodiments, lowering the rate of transmitting tracking messages can include lowering the normal rate of transmitting tracking messages by a fraction or percentage, such as, ¾, ½, ¼, or any other rate change. A normal rate of transmitting tracking messages can include, but is not limited to, sending a tracking message every minute. In the example, a lower rate for the normal one-minute rate can be reduced to sending a tracking message every two minutes. In this example, if a video is less than two minutes, then a tracking message may not be sent according to the reduced rate for sending tracking messages. In other embodiments, suppression of tracking message can include stopping or suspending the tracking messages for a period of time.

The systems and techniques described herein may improve computer technology. As described herein, some traditional systems for tracking consumption of video content send heartbeat tracking messages at regular intervals during video playback. However, an aspect of at least one of the inventions disclosed herein includes the realization that such traditional, fixed-rate heartbeat tracking potentially can result in the sending of many unnecessary messages and thus can lead to increased bandwidth usage since it is possible that many unnecessary tracking messages are sent over a network for a single media item. Further, heartbeat tracking can result in greater use of computing resources both for the devices sending the tracking messages (such as client devices) and for the devices receiving the messages (such as server devices), such as battery or power usage, or processor usage. Inefficient power usage in devices with batteries, such as mobile computing devices, drains those batteries.

Heartbeat tracking can also be inaccurate. For example, if the heartbeat tracking interval is set for thirty seconds and the user stops media playback before the thirty seconds, then the heartbeat tracking system will fail to track how much media content has been consumed. For some traditional heartbeat tracking systems, smaller time intervals or more tracking messages can result in greater granularity of tracking but uses even more bandwidth or computing resources on either the client or server side. Conversely, for some traditional heartbeat tracking systems, larger time intervals or less heartbeat tracking messages results in more efficient bandwidth and resource usage but suffers the drawback of having less granularity.

Accordingly, the systems and techniques described herein can incorporate intelligent tracking logic to suppress some tracking to conserve client or server resources or to reduce network bandwidth. More efficient power usage can result in longer battery life, which may result in a user being able to consume a greater amount of media content. Further, the intelligent tracking described herein can selectively provide greater granularity of tracking than traditional tracking systems.

The systems and techniques described herein can be intrinsically tied to network and/or computer technology because such solutions are related to tracking of services or sites such as websites over a network. For example, the techniques described herein can cause or control the generation and sending of data, such as tracking messages, over a network. Example network data includes HTTP data and uniform resource identifier data (such as uniform resource locators ("URLs")) that are intrinsically tied to network and/or computer technology.

II. Engagement Tracking Systems

FIG. 1 illustrates a computing environment 100 for implementing various engagement tracking features, including some or all of the efficient engagement tracking features described herein. In the computing environment 100, an end user system 102A, 102B communicates over a network 108 with a site server 110 or a media content service 116. The end user system 102A, 102B can include any form of computing device and may be a desktop, laptop, smartphone, tablet, or the like. A browser 103 or other application software installed in the end user system 102A accesses one or more pages 112 of a content site stored on the site server 110. The pages can include a media player for playing media content. Further, the pages can be files that may be accessed remotely and provided to the end user system 102A. Accordingly, the pages may be web pages, documents (such as pdf documents), media content, videos, audio files, images, text, combinations of the same, or the like.

A host application 107 on the end user system 102B can access or play media content from the media content service 116. The site server 110 or the media content service 116 may be a web server, an application server, a database server, combinations of the same, or the like. Further, the network 108 can include a local area network (LAN), a wide area network (WAN), a company intranet, the public Internet, combinations of the same, or the like.

The end user systems 102A, 102B can include the trackers 106A, 106B, respectively. In some embodiments, the tracker 106A executes within the browser 103 or a media player executing on the browser 103. Further, the tracker 106A may be included within one or more tags, such as a data collection tag, or may be implemented in an interpreted language or may include instructions in an interpreted language, such as JavaScript®. Thus, the tracker 106A may be executed or updated without the need to compile or recompile the instructions of the tracker 106A.

In other embodiments, the tracker 106B executes within the host application 107, which may be or include a media player. For example, the tracker 106B may be a part of a tracking software development kit (SDK) that enables the tracker 106B to execute on the end user system 102B.

The trackers 106A, 106B can receive input, such as events associated with the end user systems 102A, 102B. The input that the trackers 106A, 106B can receive can be related to the playback of media content. The playback-related input can include one or more of a media content identifier, a playback identifier, a user identifier, a playback position, a media content length, or a state of playback (e.g., "stopped," "cancelled," "complete," or "playing").

The trackers 106A, 106B can determine and send tracking messages to the collection system 180. For example, based on the input received, the trackers 106A, 106B can output one or more tracking messages associated with the media content.

The trackers 106A, 106B can include or communicate with one or more listeners that receive the input events. A listener or event handler can receive event notifications from one or more sources associated with the end user systems 102A, 102B. A source of events can include one or more input devices associated with the end user systems 102A, 102B. For example, a user, may interact with the end user systems 102A, 102B that causes the one or more input devices to generate events. The listener can operate in a loop to receive event notifications continuously. When an input event notification is received, the listener can output the event notification to the trackers 106A, 106B for processing. In some embodiments, the listener can implement one or more interfaces to communicate with the one or more sources of events.

The tracking messages from the end user systems 102A, 102B can be received, processed, or stored by the collection system 180. Tracking related data may be stored in the tracking data store 182. The tracking related data stored in the tracking data store 182 can include one or more of a media content identifier, a playback identifier, a user identifier, a playback position, a media content length, or a state of playback (e.g., "stopped," "cancelled," "complete," or "playing"). While the tracker 106A, 106B can be implemented by the end user system 102A, 102B, in some embodiments, the tracker 106A, 106B can be implemented by another system, such as the analytics system 130, which is separate from the end user system 102A, 102B.

A tag management system 140 can enable analytics users (described herein) to configure the types of data tracked for a content site provided by the site server 110 or the host application 107, as well as analyze and report on the tracking data. For instance, in some embodiments, the tag management system 140 can provide one or more user interfaces that enable customization of collecting information about users of the content site or the host application 107. This information can be obtained initially by one or more tags, which may be provided through a tag container 114 to the end user system 102A for execution in the browser 103. Upon execution in the browser 103, the tag(s) can supply tracking data to the analytics system 130 (optionally through the tag servers 120). Analytics users can subsequently query the interaction data to obtain reports or other information about visitors to the content site or users of the host application 107. In some embodiments, tracking of media content engagement may not use tags or may not be configured through a tag management system.

As shown, one or more pages 112 of the content site can include a tag container 114. The tag container 114 can be a universal tag that is installed or incorporated in one or more pages 112 in place of, or instead of, incorporating numerous tags in each page. The tag container 114 can communicate with the collection system 180 or with one or more data collection tags implemented on one or more tag servers 120. The data collection tags can include third party tags provided by tag vendors that are different entities than an operator of, or provider of, the tag container 114. In some embodiments, the data collection tags can include instructions in an interpreted language, such as JavaScript®. Tags and tag containers are described in further detail in U.S. Pat. No. 8,805,946, titled "SYSTEM AND METHOD FOR COMBINING CONTENT SITE VISITOR PROFILES," which is incorporated by reference herein in its entirety.

The tag management system 140 can be used to manage the one or more tags associated with the pages 112. For instance, the tag management system 140 can provide functionality for tag management users to select which tags to associate with which one or more content pages or one or more content objects for a variety of vendor-specific processing purposes or customize the tags for particular pages. These purposes can include obtaining analytics for data analysis or business intelligence, tracking user engagements with media content, tracking affiliate activity with respect to a content site, obtaining user data for displaying targeted ads, obtaining user data for customizing search functionality or email campaigns targeted to the end users, obtaining user data for personalizing content of a content page, obtaining user data for integration with social networking functionality, obtaining user data for big data analysis, combinations of the same, or the like.

A tag management user system 104 can access the tag server 120 or the analytics system 130 via the network 108. Like the end user system 102A, 102B, the tag management user system 104 can include a browser 105 or other application software that can access network applications over the network 108. The tag management user system 104 can also be any type of computing device including, but not limited to, a desktop, laptop, tablet, smartphone, or the like. The tag management user system 104 can be operated by tag management users such as marketing professionals, website operators, business users, operators of a content site or the site server 110, or any other individual who uses tag objects or tags or data obtained therefrom. Tag management users are not the end users of a content site in certain embodiments. The tag management users can use the tag management user system 104 to dynamically update the types of data tracked or analyzed for different visitors of a content site or for users of a host application. In addition, the tag management user can use the tag management user system 104 to customize tag objects or tags for particular content pages or content objects or for configuring the tracker 106A, 106B.

Figure 2A:
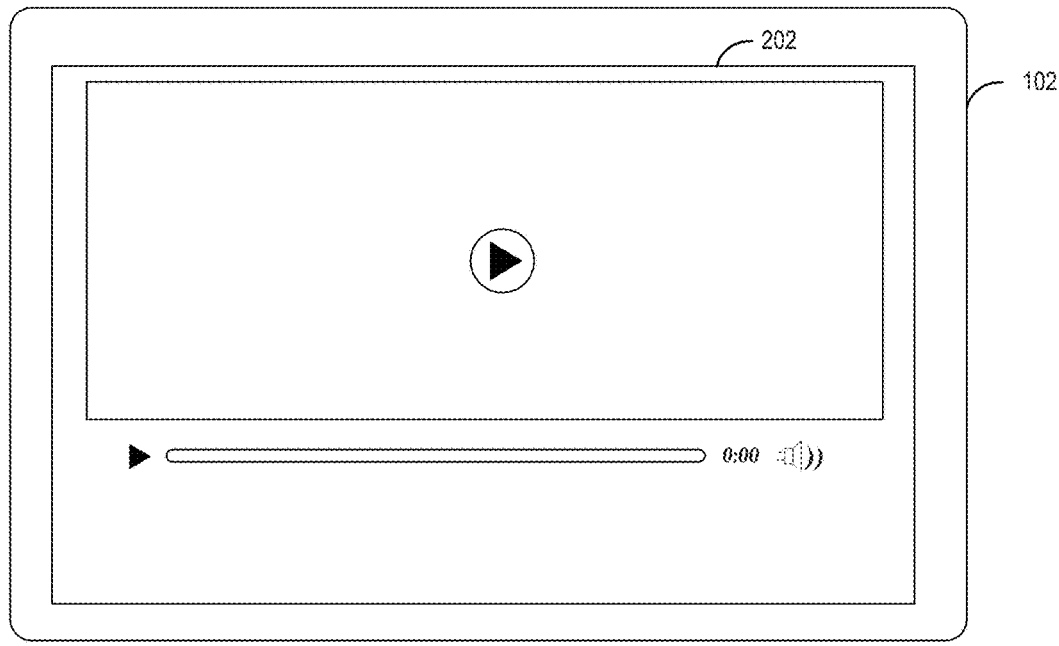
FIGS. 2A-2B depict an example end user system.
Figure 2B:
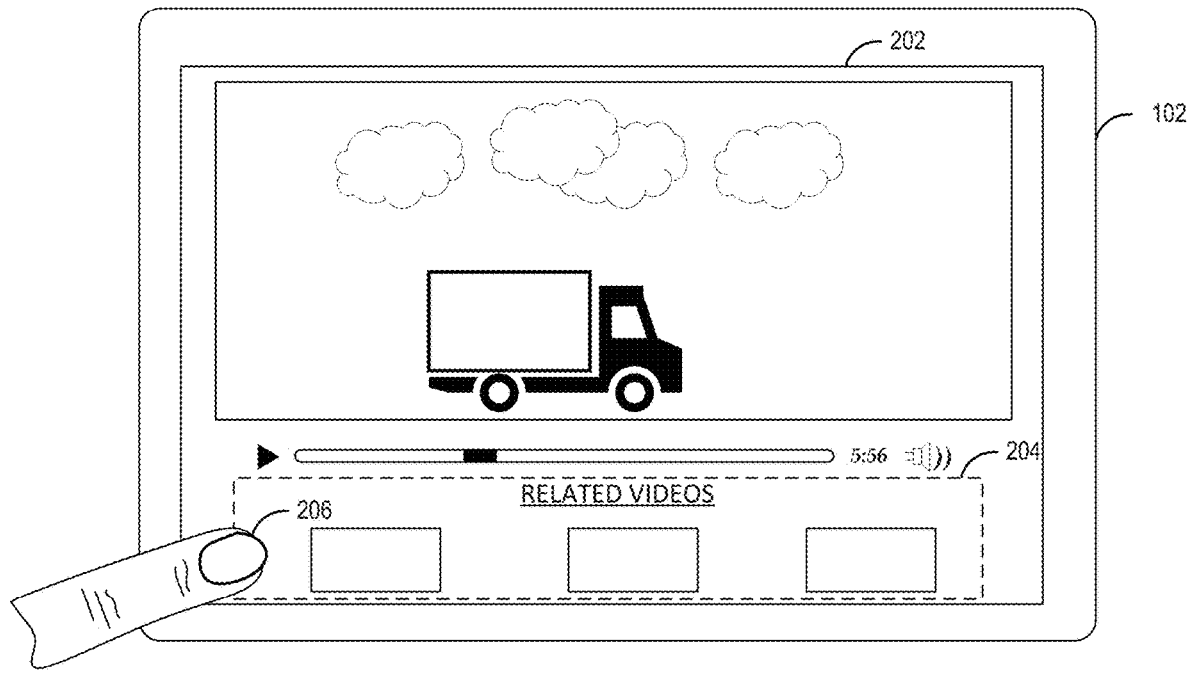

In FIGS. 2A and 2B, an example end user system 102 is depicted. The end user system 102 can be the end user system 102A, 102B of FIG. 1. As illustrated, the end user system 102 includes a media player 202. The media player 202 may be a host application or may be executed in a browser. A user may initiate playback of media content in the media player 202. Turning to FIG. 2B, playback of media content, such as a video, is shown in the media player 202. As illustrated, a user interaction 206 may be detected by the end user system 102. For example, the user interaction 206 may be a touch interaction with a related videos section 204 of the media player 202. The user interaction 206 may indicate that a user has lost interest with the media content and that the user may stop their engagement with the media content, such as by selecting another media content, exiting the media player, or by stopping the playback of the media content. As described herein, the user interaction 206 causes an event to be generated that may be determined to correspond to or match an abandonment indicator. Further, a tracker 106A, 106B or a tracking system may generate and send one or more tracking messages in response to the detection of the abandonment indicator.

III. Engagement Tracking Processes

Figure 3A:
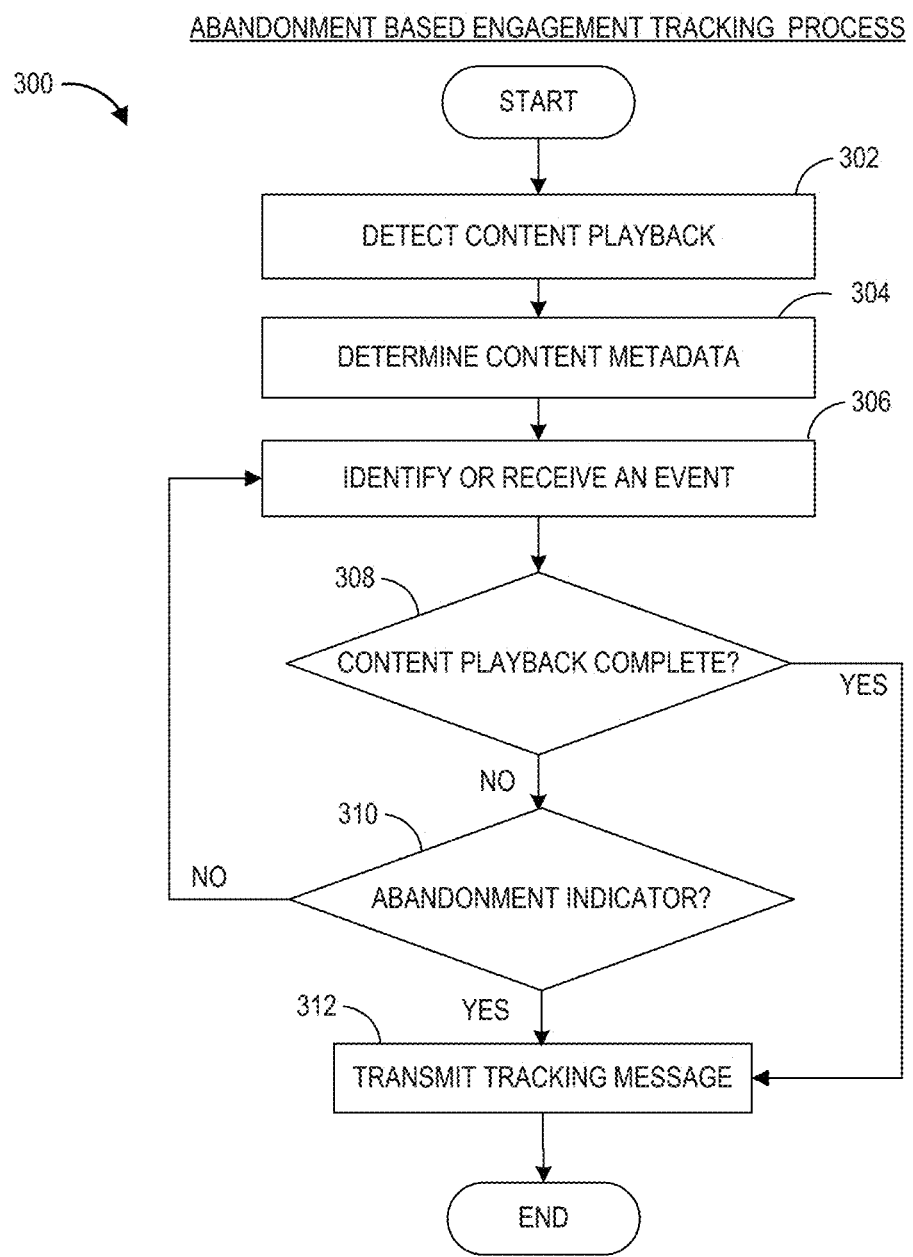
FIG. 3A depicts an embodiment of an abandonment based engagement process.
Figure 3B:
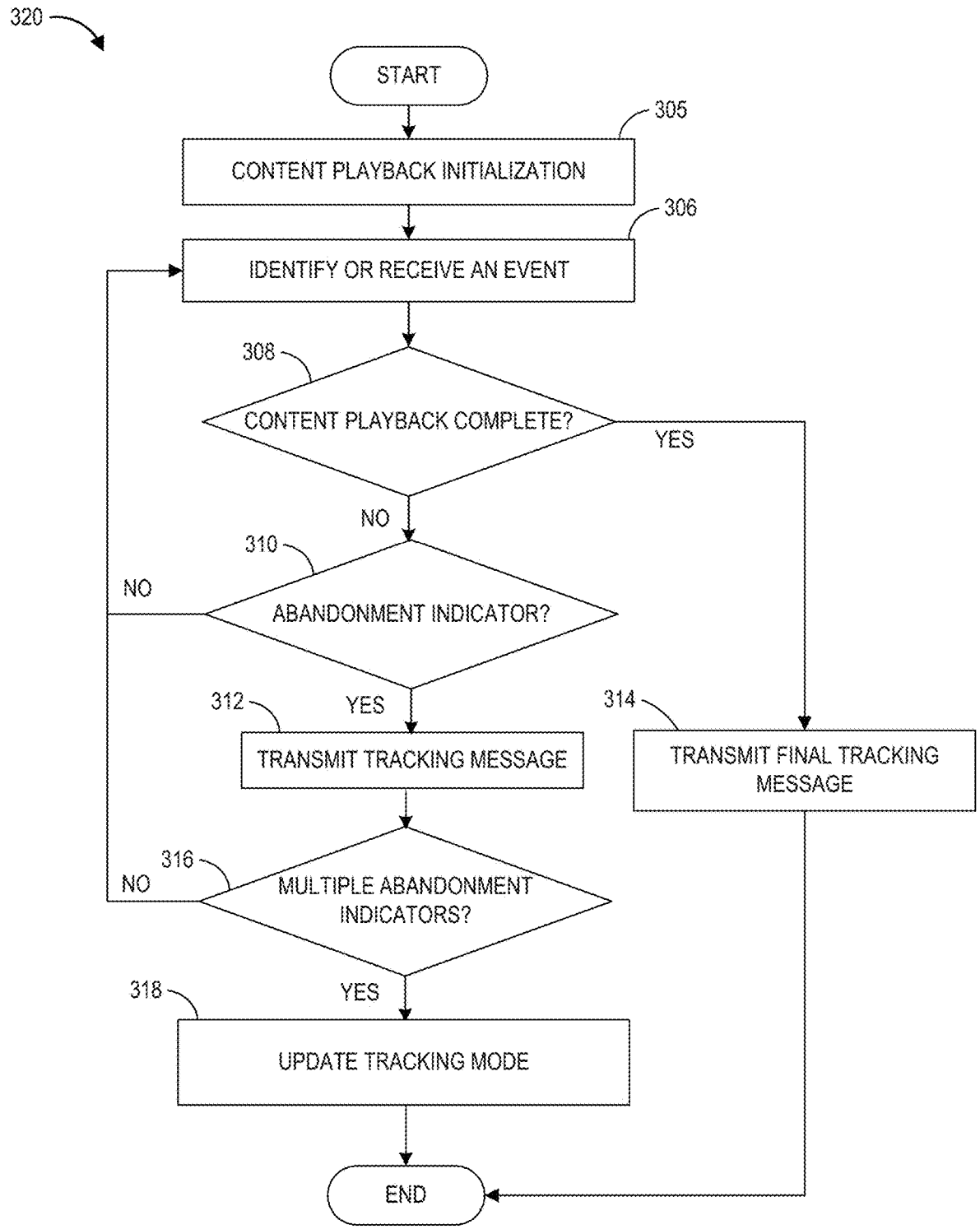
FIG. 3B depicts an embodiment of another abandonment based engagement process.
Figure 3C:
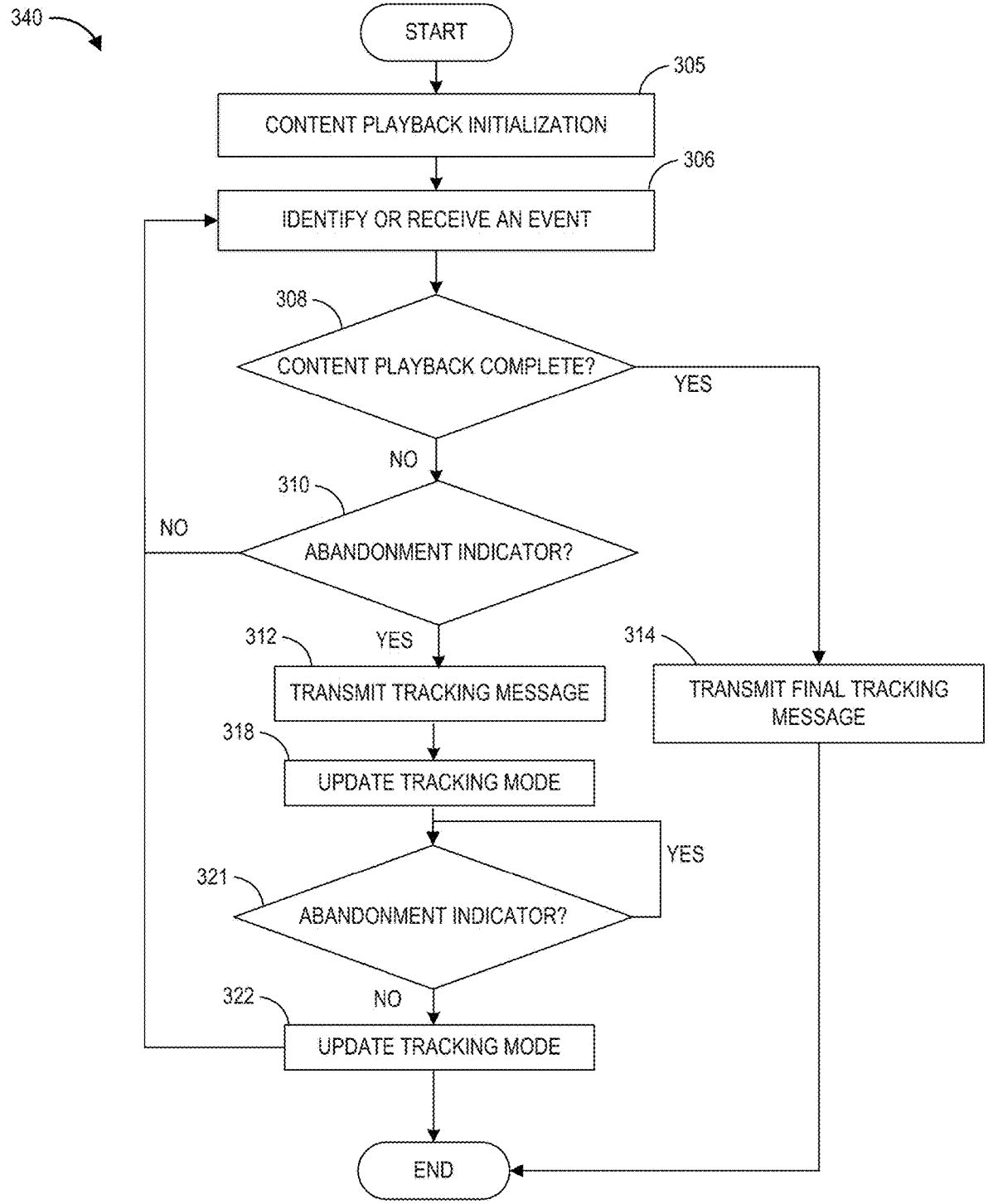
FIG. 3C depicts an embodiment of yet another abandonment based engagement process.

FIGS. 3A, 3B, and 3C depict different engagement tracking embodiments. The processes 300, 320, and 340 illustrate example modes of operation of the computing environment 100 and may be implemented by the various components shown in the computing environment 100. For convenience, the processes 300, 320, and 340 are described in the context of the computing environment 100, but may instead be implemented by other systems described herein or other computing systems not shown. The processes 300, 320, and 340 provide example approaches by which abandonment-based engagement tracking can be implemented. Depending on the embodiment, the processes 300, 320, and 340 may include fewer or additional blocks and/or the blocks may be performed in order different than is illustrated.

In some embodiments, any of the processes 300, 320, and 340 can suppress tracking messages by reducing the rate of sending tracking messages. For example, tracking messages can be sent at a first tracking rate. An example first tracking rate can include sending tracking messages every 5 seconds. The tracking rate can be reduced to a second tracking rate. An example second tracking rate can include sending tracking messages every 30 seconds instead of the first tracking rate for sending tracking messages every 5 seconds. As described herein, an abandonment indicator can be detected.

The tracking rate can then be increased to a rate greater than the second tracking rate. For example, in response to the detection of an abandonment indicator, the tracking rate can be increased to every 5 seconds (the first tracking rate) or any other rate than that is greater than the second tracking rate of every 30 seconds.

Turning to FIG. 3A, an example engagement tracking process 300 is shown. At block 302, playback of media content is detected. For example, the tracker 106A, 106B or a tracking system detects playback of media content. The tracker 106A, 106B can detect playback of media content in a media player. In some embodiments, a media player may notify the tracker 106A, 106B that playback has started. In other embodiments, the tracker 106A, 106B can detect a start event that is associated with playback of the media content. After detection of playback, in some embodiments, the tracker 106A, 106B can transmit a tracking message that playback of the media content has begun.

At block 304, the metadata associated with playback of the media content, which can include engagement or tracking data, is determined. For example, the tracker 106A, 106B can determine metadata associated with playback of the media content. Example metadata includes a media content identifier, a playback identifier, a user identifier, a playback position, a media content length, a state of playback (e.g., "stopped," "cancelled," "complete," or "playing"). Some or all of the metadata may be transmitted in a tracking message.

A tracking message can be in various formats depending on the embodiment. In some embodiments, a tracking message may be the format of an HTTP request. The tracking message can specify a URL of the data collection server and can include parameters that include the metadata associated with the playback of the media content. An example HTTP tracking message is: https://[data_collection_server_domain_name].com/collect?event_type=video-play&video_name=example+content.mov&video-state=playing&video-position=330&video-length=600.

The tracking message can identify the type of tracking (in the example, video playback), a media content identifier (in the example, the video name), a playback state (in the example, a playing state), a playback position (in the example, 330 seconds), and a length of the media content (in the example, 600 seconds or 10 minutes). Depending on the embodiment, the tracking message may include more or less information than the foregoing example. For example, a media content "start" tracking message may not include a playback position since the current position may be assumed to be zero or a media content "complete" tracking message may not include a playback position since the current position may be assumed to be the length of the media content. In other embodiments, the tracking message can include a JavaScript® Object Notation (JSON) data format for transmitting metadata associated with tracking playback of media content.

At block 306, an event is identified or received. For example, the tracker 106A, 106B identifies or receives one or more events generated by the end user system 102A, 102B. For example, the tracker 106A, 106B or another process or application can activate a listener that receives events generated by the end user system 102A, 102B. The received events can represent a change in the state of the end user system 102A, 102B, such as any type of received user input or any change in state of an application (such as the starting or stopping of the application) on the end user system 102A, 102B.

At block 308, it can be determined whether the playback of media content is complete. For example, the tracker 106A, 106B can determine if playback of the media content is complete. The tracker 106A, 106B can receive an event indicating that playback is complete or can receive a message from the media player that playback has completed. In other embodiments, the tracker 106A, 106B can query the media player to determine if playback is complete. As illustrated in the engagement tracking process 300, if content playback is complete, then the tracker 106A, 106B can send a playback complete tracking message to the collection system 180. If playback is not complete, the tracker 106A, 106B proceeds to block 310.

In some situations, an abandonment indicator may not be detected during playback. For example, the tracker 106A, 106B may not detect any abandonment indicators during playback. Therefore, the tracker 106A, 106B can suppress preparing or sending tracking messages, which may advantageously reduce network bandwidth or may conserve computing resources. In some embodiments, the tracker 106A, 106B has various modes, which can include a tracking suppression mode that suppresses preparing or transmitting one or more tracking messages. By default, the tracker 106A, 106B may start in tracking suppression mode. Thus, in some cases, it is possible for the tracker 106A, 106B to remain in a tracking suppression mode throughout an entire media playback session. Thus, while in suppression mode, some tracker embodiments 106A, 106B send a reduced number of tracking messages to the collection system 180 (such as a single playback start tracking message and a single playback end tracking message) that accurately reflects user engagement with the media content. For example, some tracker embodiments 106A, 106B can have a normal rate of sending tracking messages. As described herein, while in suppression mode, the tracker embodiments 106A, 106B can have a reduced rate of sending tracking messages.

At block 310, it can be determined if there is an abandonment indicator. For example, the tracker 106A, 106B determines if the event corresponds to the abandonment indicator. The tracker 106A, 106B can determine whether the event matches one or more abandonment indicators. The tracker 106A, 106B can determine a match or not by comparing the event to a collection of abandonment indicator types. As described herein, example abandonment indicator types include event types corresponding to a user moving a mouse, touch input, moving a computing device, activating an intelligent personal assistant application, providing voice input, or touching a home button on the computing device. In some embodiments, the tracker 106A, 106B compares the event with a list of abandonment indicator types.

In some situations, the tracker 106A, 106B receives events that do not match or correspond to an abandonment indicator, such as any number of non-abandonment events that may be generated by processes running on the end user system 102A, 102B. If the tracker 106A, 106B determines the presence of an abandonment indicator, then the tracker proceeds to block 312 to transmit a tracking message or disables the tracking suppression mode. However, if there is not an abandonment indicator, the tracker 106A, 106B may enable or remain in the tracking suppression mode that suppresses preparing or sending tracking messages to a collection system. In the tracking suppression mode, the tracker 106A, 106B may continue to listen for events that correspond to an abandonment indicator, such as by returning to block 306.

In some embodiments, the tracker 106A, 106B uses conditional logic for determining whether an event corresponds to an abandonment indicator. The tracker 106A, 106B can include instructions customized for detecting abandonment indicators based on the type of end user system 102A, 102B. For example, the instructions for detecting abandonment indicators for desktop computer devices and can be different from instructions that are customized for detecting abandonment indicators for mobile devices. Thus, the tracker 106A, 106B can apply different abandonment indicator logic depending on the type of end user system 102A, 102B or particular hardware of the end user system 102A, 102B. In some embodiments, the abandonment indicator logic can include thresholds for determining whether an abandonment indicator is present. The abandonment indicator logic may include thresholds for certain user interactions, such as user swipes or touches, to last a threshold amount of time to be considered an abandonment indicator.

For example, the abandonment logic may determine the presence of an abandonment indicator if the touch user interaction is greater than a threshold amount of time, such as 10 milliseconds, 50 milliseconds, 100 milliseconds, or 1 second. Thus, the abandonment indicator logic can distinguish between inadvertent user input and more deliberate user input that is indicative potential abandonment. Further, the abandonment indicator logic can distinguish between types of events or user input. For example, user input corresponding to a user navigating to a different location within the media content may not be classified as an abandonment indicator; however, user input corresponding to a user browsing other content in the media player during media playback may be classified as an abandonment indicator, since browsing of other content may be indicative that user may proximately cease playback of the media content.

In some embodiments, the tracker 106A, 106B uses dynamic logic for determining whether an event corresponds to an abandonment indicator. The abandonment indicator logic for detecting whether an event corresponds to an abandonment indicator can be remotely updated by an external server in either the browser or the host application context. Remote transmission of conditional logic is described in further detail in U.S. Pat. No. 9,363,311, titled "DELIVERY OF INSTRUCTIONS IN HOST APPLICATIONS," which is incorporated by reference herein in its entirety.

At block 312, a tracking message is prepared or sent. For example, the tracker 106A, 106B prepares or transmits a tracking message to the collection system 180. As described herein, the tracking message can include metadata associated with the playback of the media content, such as by including a playback position of the media content. Further, a tracking message can be sent over the network in an HTTP request format. In some embodiments, after detecting an abandonment indicator and transmitting a tracking message, the tracker 106A, 106B can enable a higher rate mode and can send tracking messages at a higher rate to the collection system 180.

Turning to FIG. 3B, another example engagement tracking process 320 is shown. The engagement tracking process 320 of FIG. 3B may be a variation of or similar to the engagement tracking process 300 of FIG. 3A. For example, some blocks of the engagement tracking process 320 of FIG. 3B may similar to blocks of the engagement tracking process 300 of FIG. 3A.

At block 305, media playback is detected or tracking of media playback is initialized. The initialization of the tracking of media playback can include the tracker 106A, 106B detecting content playback or determining content metadata, which can be similar to blocks 302 or 304 of FIG. 3A.

Blocks 306, 308, 310, and 312 of FIG. 3B may be similar to blocks 306, 308, and 310 of FIG. 3A. For example, the tracker 106A, 106B identifies or receives one or more events generated by the end user system 102A, 102B (block 306); determines if playback of the media content is complete (block 308); determines if the event corresponds to the abandonment indicator (block 310); and prepares or transmits a tracking message to the collection system 180 (block 312). At block 308, if content playback is complete, the tracker 106A, 106B proceeds to block 314 transmits a final playback complete tracking message to the collection system 180, as described herein.

At block 316, multiple abandonment indicators can be detected. For example, the tracker 106A, 106B determines if there are multiple abandonment indicators within a threshold period of time. The tracker 106A, 106B, using the listener, can determine if there are multiple events that correspond to an abandonment indicator. The tracker 106A, 106B, within a configurable period of time, can determine if a threshold number of abandonment indicators are detected. For example, the tracker 106A, 106B, can determine if a threshold number of abandonment indicators are detected within a period of time, such as thirty seconds. Determining if multiple abandonment indicators are present can include: receiving two or more events within a threshold period of time; determining a subset of the events that match an abandonment indicator; and determining that a quantity of the events matching an abandonment indicator exceeds a threshold. The threshold number of abandonment indicators may indicate an increased likelihood that the user is close to ending their engagement with the media content. Thus, the tracker 106A, 106B proceeds to block 318 where multiple abandonment indicators have been determined. If multiple abandonment indicators are not determined, the tracker 106A, 106B proceeds to block 306 to continue in the loop of blocks 306, 308, 310, 312, or 316. The loop of blocks 306, 308, and 310 may correspond to a tracking suppression mode of the tracker 106A, 106B that checks for single abandonment indicators and transmits tracking messages at a reduced rate or suppresses all tracking messages where applicable until a playback complete event is detected.

At block 318, the tracking mode can be updated. For example, where multiple abandonment indicators have been determined, the tracker 106A, 106B updates the tracking mode. An example tracking mode includes a heartbeat tracking mode. In some embodiments, the heartbeat tracking mode uses a normal or reduced time interval for sending tracking messages. The time interval or the "rate" may be predetermined or may be dynamically determined depending on the embodiment. In the heartbeat tracking mode, the tracker 106A, 106B repeatedly transmits (such as after every time interval that has elapsed), to the collection system 180, a tracking message that includes an updated playback position of the media content until playback of the media content ends. Thus, it may be acceptable for the tracker 106A, 106B to enter a heartbeat tracking mode and use greater computing resources and bandwidth for a short period of time since it has been determined that a user will possibly stop playback soon based on the detection of multiple abandonment indicators. In some embodiments, the heartbeat tracking mode is maintained until playback of the media content ends or a condition is satisfied. The condition can indicate that one or more tracking messages should be suppressed (e.g., a period of time elapses without detecting one or more abandonment indicators), such as by enabling or re-enabling a tracking suppression mode.

Turning to FIG. 3C, yet another example engagement tracking process 340 is shown. The engagement tracking process 340 of FIG. 3C may be a variation of or similar to the engagement tracking processes 300 of FIG. 3A, 320 of FIG. 3B. For example, some blocks of the engagement tracking process 340 of FIG. 3C may similar to blocks of the engagement tracking process 300 of FIG. 3A, 320 of FIG. 3B.

Block 305 of FIG. 3C may be similar to block 305 of FIG. 3B. The tracker 106A, 106B can detect playback of media content. Blocks 306, 308, 310, and 312 of FIG. 3C may be similar to blocks 306, 308, and 310 of FIG. 3A. For example, the tracker 106A, 106B identifies or receives one or more events generated by the end user system 102A, 102B (block 306); determines if playback of the media content is complete (block 308); determines if the event corresponds to the abandonment indicator (block 310); and prepares or transmits a tracking message to the collection system 180. At block 308, if content playback is complete, the tracker 106A, 106B proceeds to block 314 and transmits a playback complete tracking message to the collection system 180, as described herein.

At block 318, the tracking mode can be updated. For example, after determining the presence of an abandonment indicator and transmitting a tracking message, the tracker 106A, 106B updates the tracking mode. As described herein, an example tracking mode includes a heartbeat tracking mode. The tracker 106A, 106B can remain in the heartbeat tracking mode (repeatedly sending tracking messages) until playback of the media content ends or a condition to re-enable the tracking suppression mode is satisfied. The condition can include determining whether an abandonment indicator is present or not within a time interval.

At block 321, the presence of an abandonment indicator can be determined. For example, the tracker 106A, 106B can remain in the heartbeat tracking mode while the presence of abandonment indicators is determined at block 321. The tracker 106A, 106B may continue sending tracking messages in a loop at a given time interval (e.g., every 15 seconds) while the presence of one or more abandonment detectors is determined within a threshold period of time (e.g., every 30 seconds). If, after a threshold period of elapsed time, the tracker 106A, 106B has not received an event in the elapsed time or has not received an event that matches an abandonment indicator in the elapsed time, the tracker 106A, 106B proceeds to block 322 to update the tracking mode.

At block 322, the tracking mode can be updated. For example, the tracker 106A, 106B can enter a different tracking mode. The tracker 106A, 106B can disable the heartbeat tracking mode and enable (or re-enable) the tracking suppression mode and return to block 306 to continue checking for events. As described herein, the tracker 106A, 106B may efficiently send tracking message in response to detection of abandonment indicators and reduce network bandwidth or conserve computing resources.

IV. Engagement Tracking Examples

Figure 4A:
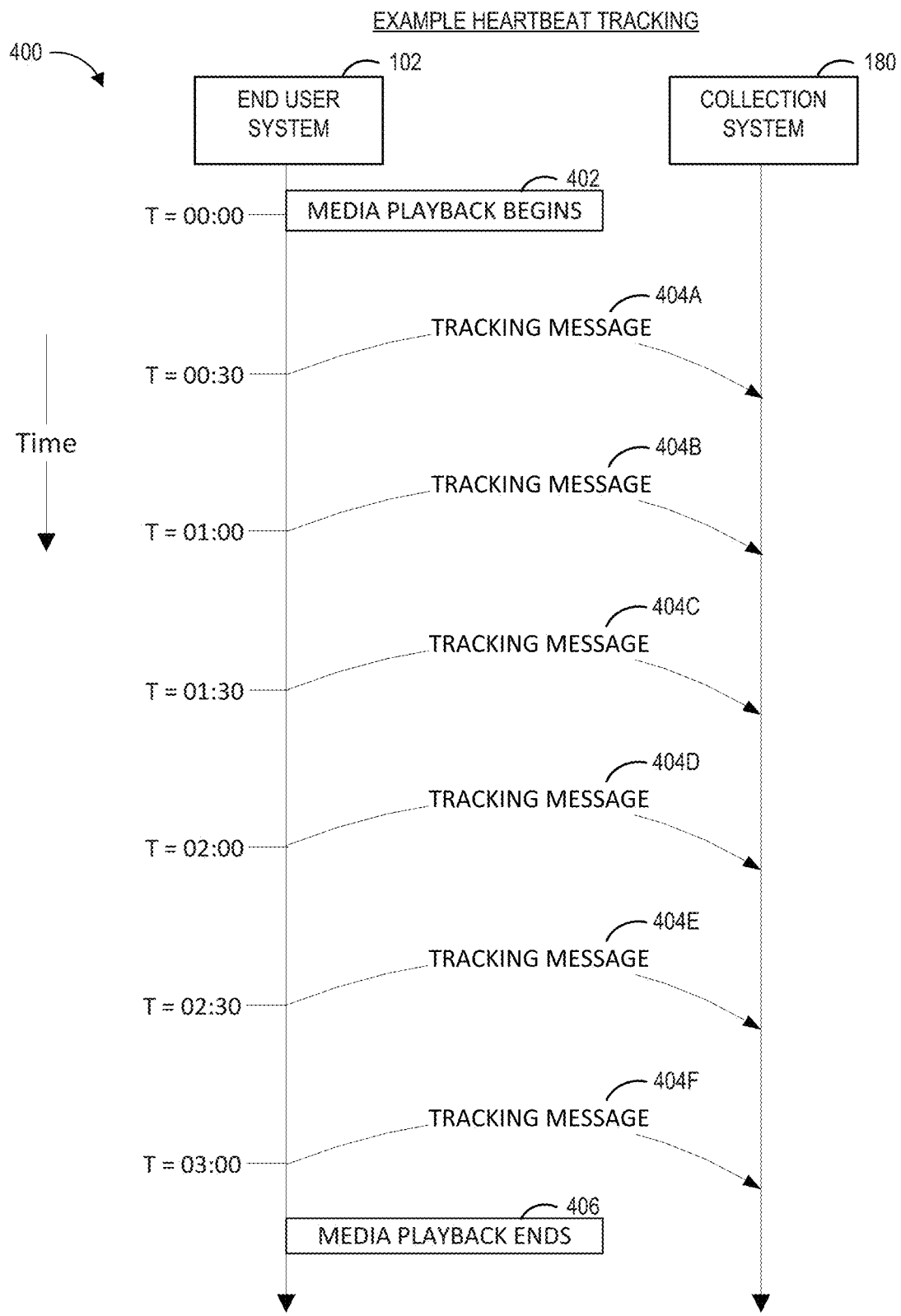
FIGS. 4A-4B depict example heartbeat tracking.
Figure 4B:
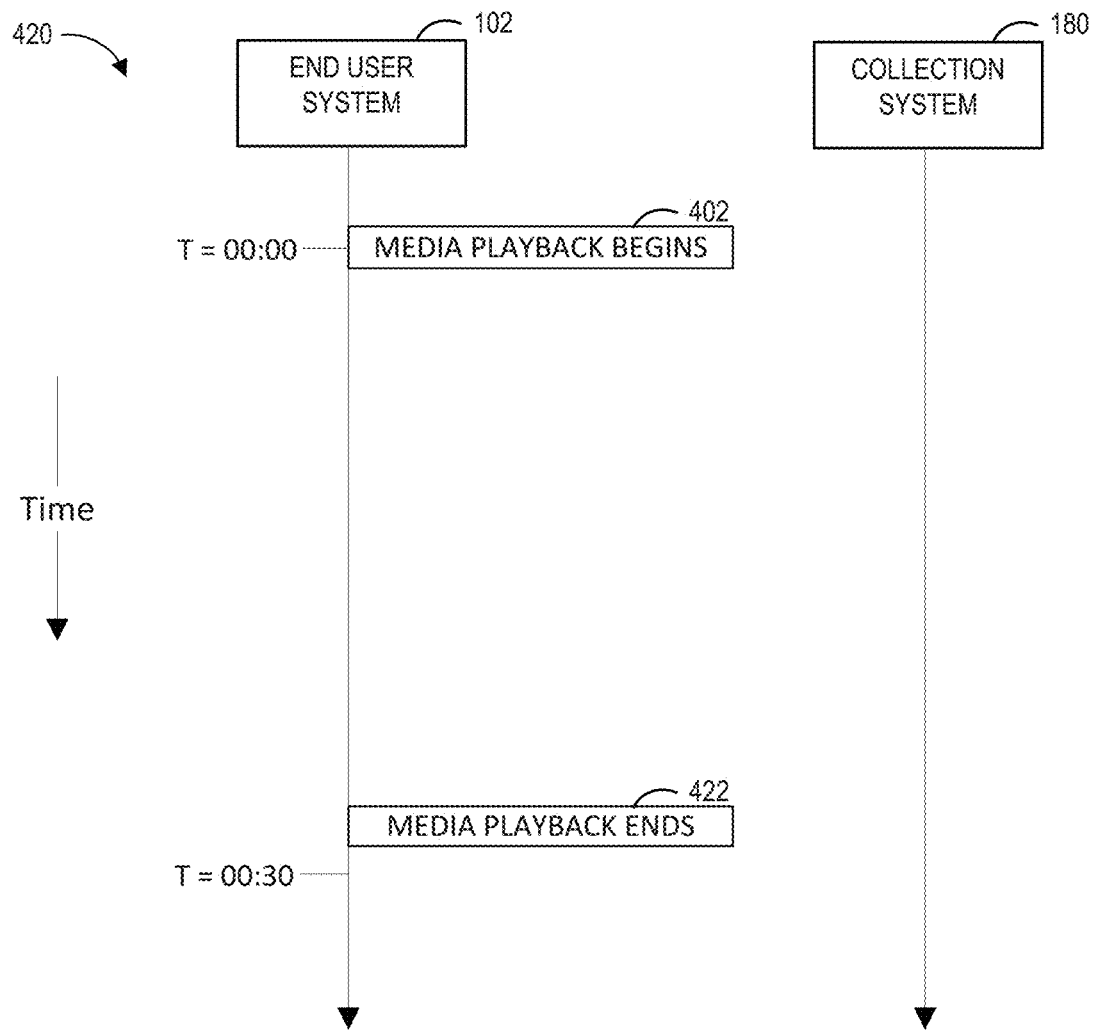

In FIGS. 4A and 4B, example heartbeat tracking is depicted. In FIG. 4A, the network environment 400 can include an end user system 102 and a collection system 180. As shown, the end user system 102 can transmit tracking messages 404A-404F to the collection system 180 between the media playback starting state 402 and the media playback ending state 406. The end user system 102 can send tracking messages at 30 second intervals. However, as shown, the preparation and transmission of multiple tracking messages 404A-404F at regular intervals in a heartbeat mode may be resource intensive and may result in increased network bandwidth.

In some embodiments, heartbeat tracking messages can be sent at set intervals, such as every 5, 10, 15, 20, or 30 seconds, for example. In other embodiments, the intervals for heartbeat tracking can be determined based on configurable percentages or the length of the media content. For example, a configurable percentage could be ten percent. Thus, for a ten-minute video, the system can determine to send a heartbeat tracking every minute. With percentage heartbeat tracking, longer media content has longer timer intervals and shorter media content has shorter time intervals for the same percentage. Determining a time interval for heartbeat tracking can include: determining a duration of the media content, and calculating the time interval from a percentage value and the amount of time. In some embodiments, the system can determine the intervals from a remaining amount of time of the media content, such as the remaining time that is left of the media content during playback. Thus, if there is five minutes remaining of playback for a video, and the percentage is set to twenty percent, the time interval for sending tracking messages can be determined to be every minute for the remainder of the media content.

FIG. 4B may be similar to FIG. 4A. The network environment 420 can include an end user system 102 and a collection system 180 where the end user system 102 is configured for heartbeat tracking. In the example, the heartbeat tracking may be set to 30 second intervals. However, as shown, the media playback ends before 30 seconds of media playback has elapsed. Thus, the heartbeat tracking in this example would fail to accurately track the playback of the media content since playback ended before the heartbeat time interval had elapsed and before a tracking message was scheduled to be sent.

Figure 5A:
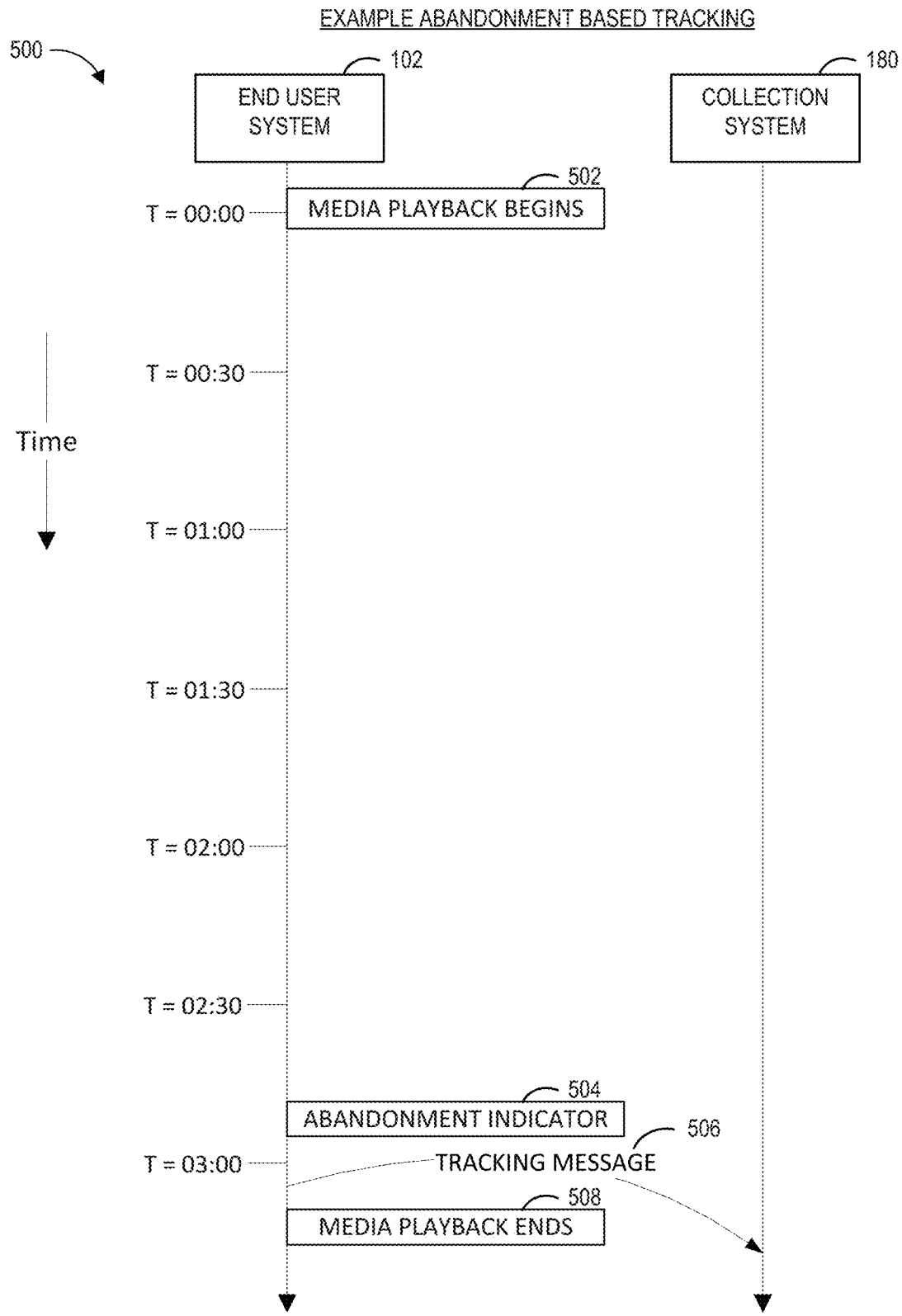
FIGS. 5A-5B depict example abandonment-based engagement tracking
Figure 5B:
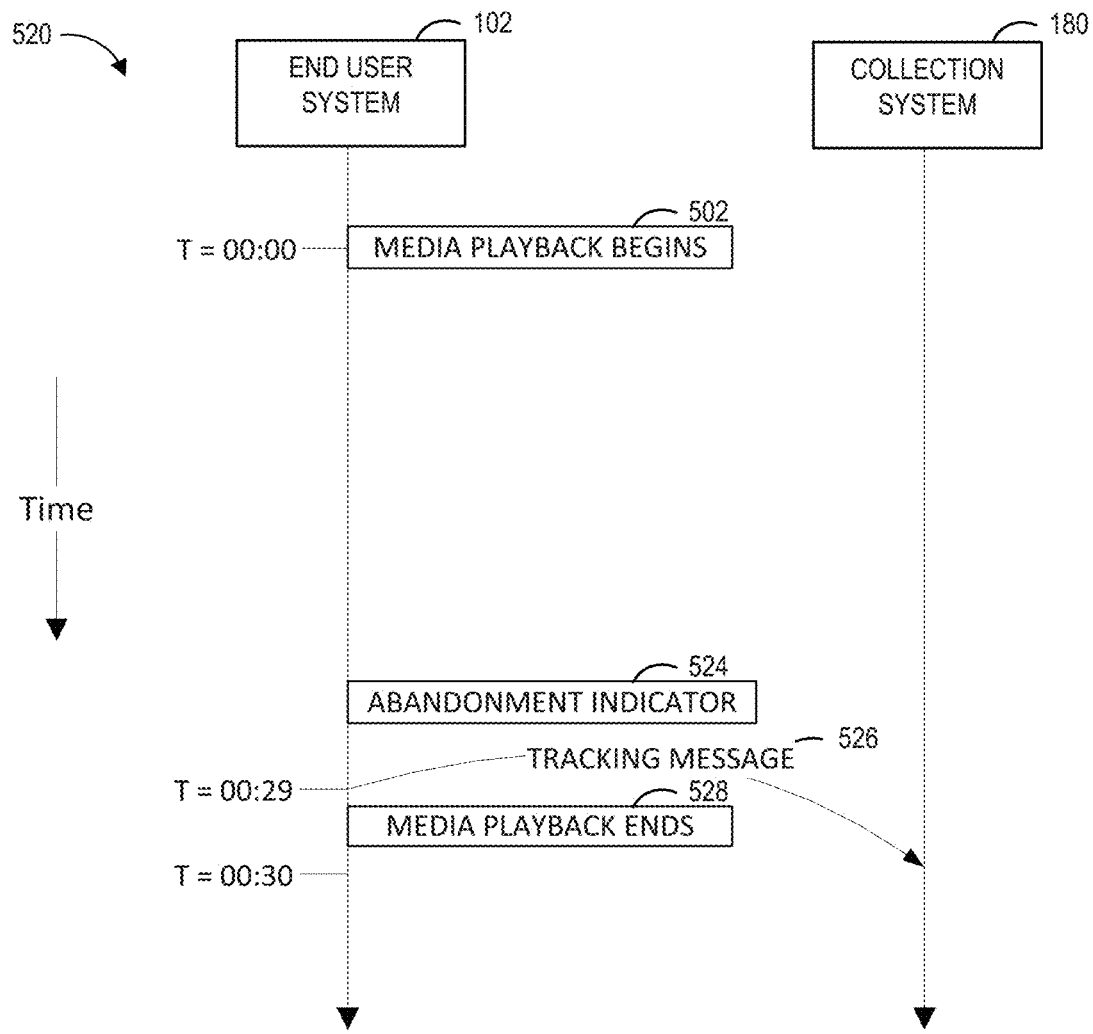

In FIGS. 5A and 5B, example abandonment-based engagement tracking is depicted. In FIG. 5A, the network environment 500 can include an end user system 102 and a collection system 180. As shown, after the media playback starting state 502, an abandonment indicator 504 is detected before the 3:00 minute mark. Following the detection of the abandonment indicator 504, the end user system 102 is configured to prepare or transmit a tracking message 506 to the collection system 180. The tracking message 506 can report the playback position of the media content, other tracking information, or other metadata. Thus, the end user system 102 is configured to efficiently send a minimal number of tracking messages based on intelligent detection of abandonment indicators. As shown, in contrast to the heartbeat tracking in FIG. 4A that used substantial computing resources and network bandwidth to generate and send the tracking messages in 404A-404F, the abandonment based engagement tracking shown in FIG. 5A sent a reduced number of tracking messages and conserved computing resources and resulted in reduced network bandwidth usage. The embodiment of FIG. 5A may correspond to the engagement tracking process 300 of FIG. 3A.

FIG. 5B may be similar to FIG. 5A. The network environment 520 can include an end user system 102 and a collection system 180 where the end user system 102 is configured for a type of abandonment based engagement tracking. In the example, an abandonment indicator 524 is detected before 30 seconds has elapsed. The end user system 102 is configured with abandonment based engagement tracking. Thus, following the detection of the abandonment indicator 524, the end user system 102 is configured to transmit a tracking message 526 to the collection system 180. As shown, in contrast to the heartbeat tracking in FIG. 4B that failed to accurately report the user engagement with the media content, the abandonment based engagement tracking shown in FIG. 5B operated with greater granularity than the heartbeat tracking by being able to detect the abandonment indicator 524 and to transmit the tracking message 526 without relying on a set heartbeat tracking interval. The embodiment of FIG. 5B may correspond to the engagement tracking process 300 of FIG. 3A.

Figure 6A:
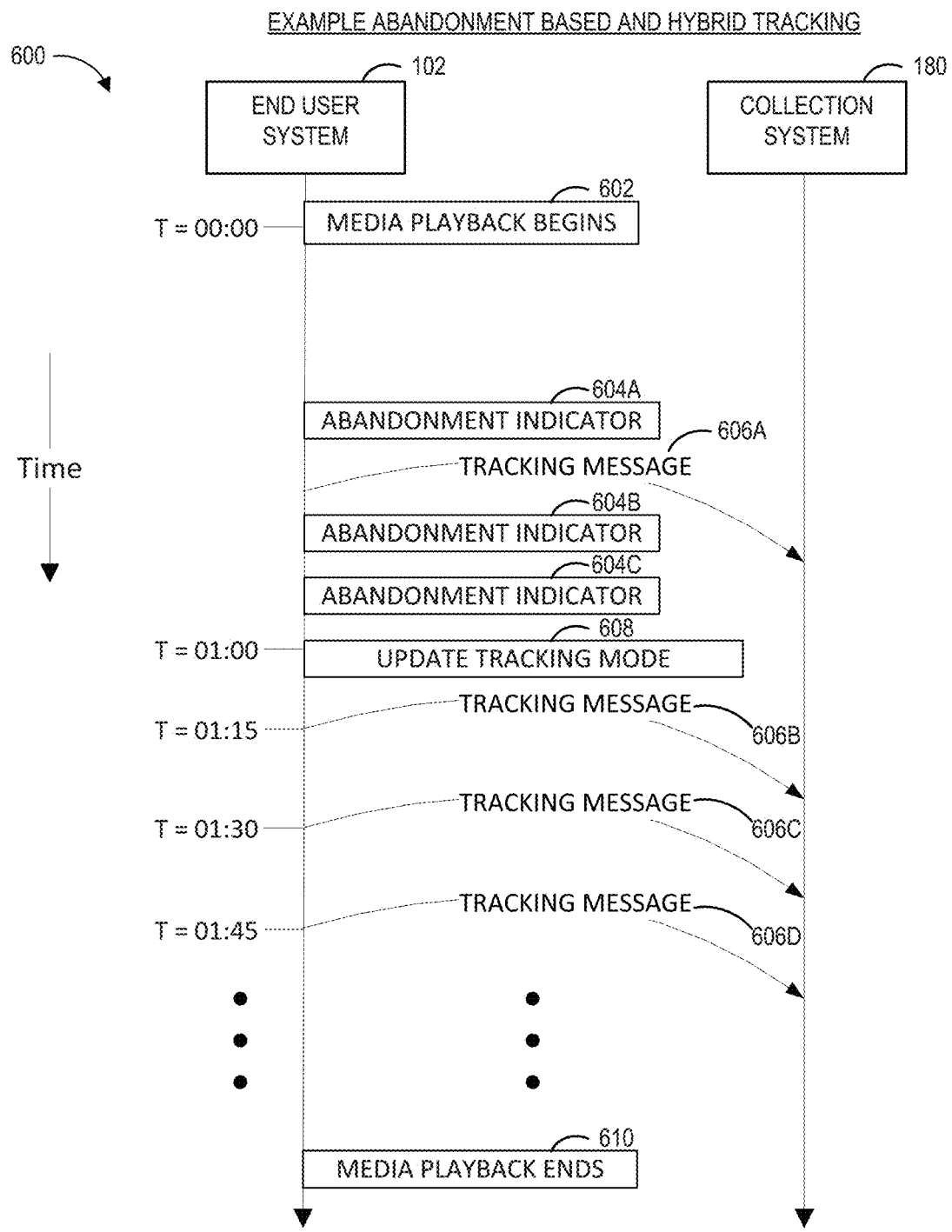
FIGS. 6A-6B depict additional example abandonment-based engagement tracking
Figure 6B:
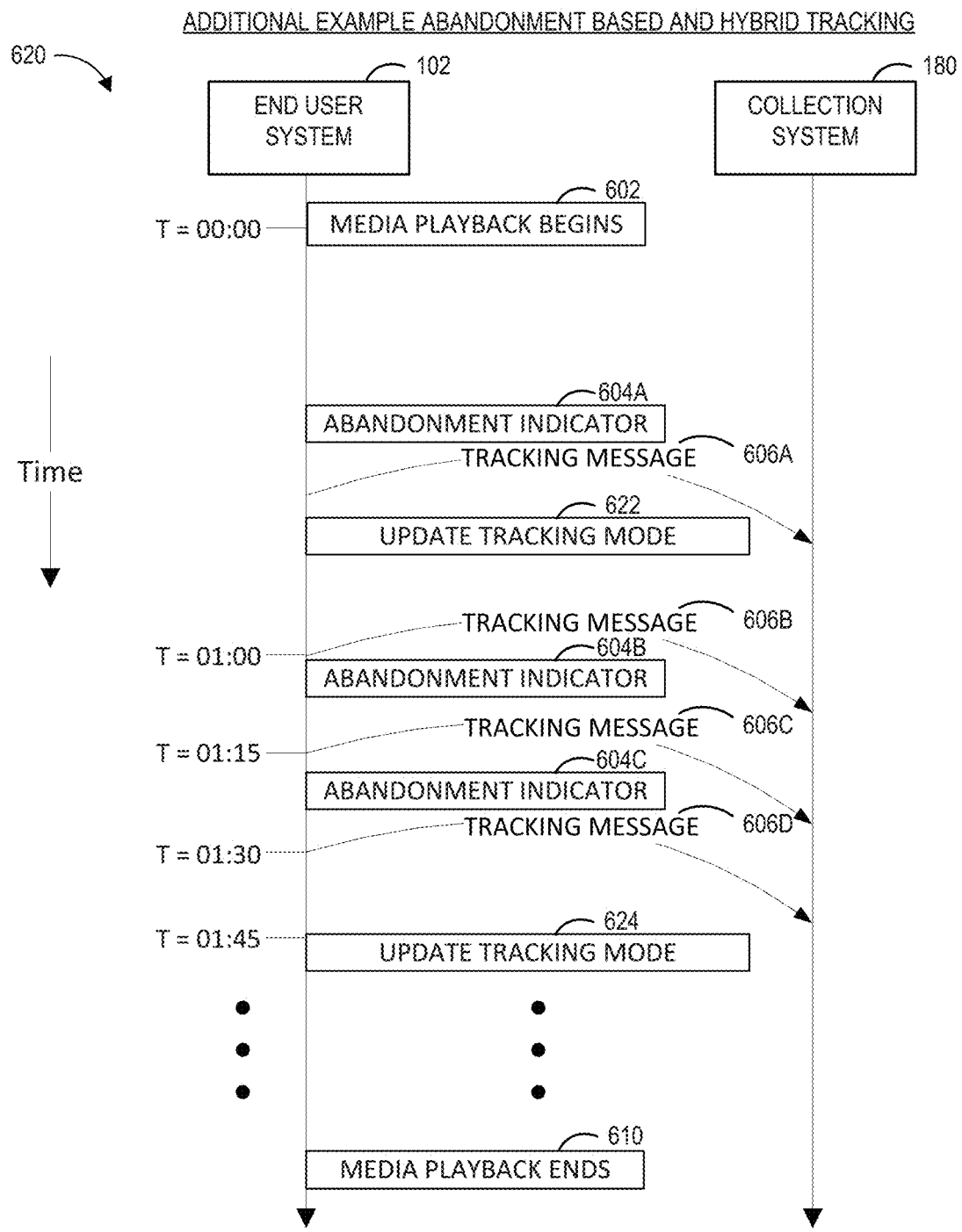

In FIGS. 6A and 6B, additional abandonment-based engagement tracking examples are depicted. In FIG. 6A, the network environment 500 can include an end user system 102 and a collection system 180. The end user system 102 is configured with a type of abandonment based engagement tracking. As shown, after the media playback state 602, an abandonment indicator 604A is detected. Following the detection of the abandonment indicator 604A, the end user system 102 is configured to transmit a tracking message 606A to the collection system 180. The end user system 102 is configured to detect multiple abandonment indicators 604B and 604C within a threshold period of time. In response to the detection of the multiple abandonment indicators 604B and 604C, the end user system 102 is further configured to update the state of the tracking mode 608. The updated tracking mode can be a heartbeat tracking mode where the end user system 102 is configured to send the heartbeat tracking messages 606B-606D until the media playback ending state 610. The embodiment of FIG. 6A may correspond to the engagement tracking process 320 of FIG. 3B.

FIG. 6B may be similar to FIG. 6A. The network environment 520 can include an end user system 102 and a collection system 180 where the end user system 102 is configured with a type of abandonment based engagement tracking. As shown, after the media playback state 602, an abandonment indicator 604A is detected. Following the detection of the abandonment indicator 604A, the end user system 102 is configured to transmit a tracking message 606A to the collection system 180. The end user system 102 is configured to update the state of the tracking mode 622 to a heartbeat tracking mode. In the heartbeat tracking mode, the end user system 102 is further configured to send the heartbeat tracking messages 606B-606D while the abandonment indicators 604B and 604C are being detected. As shown, since an abandonment indicator is not detected for a threshold period of time, the end user system 102 is configured to update the tracking mode state 624 to a tracking suppression mode where the end user system 102 is configured to listen for abandonment indicators and to not send tracking messages until an abandonment indicator is detected. The embodiment of FIG. 6B may correspond to the engagement tracking process 340 of FIG. 3C.

V. Example Implementation Mechanisms

Figure 7:
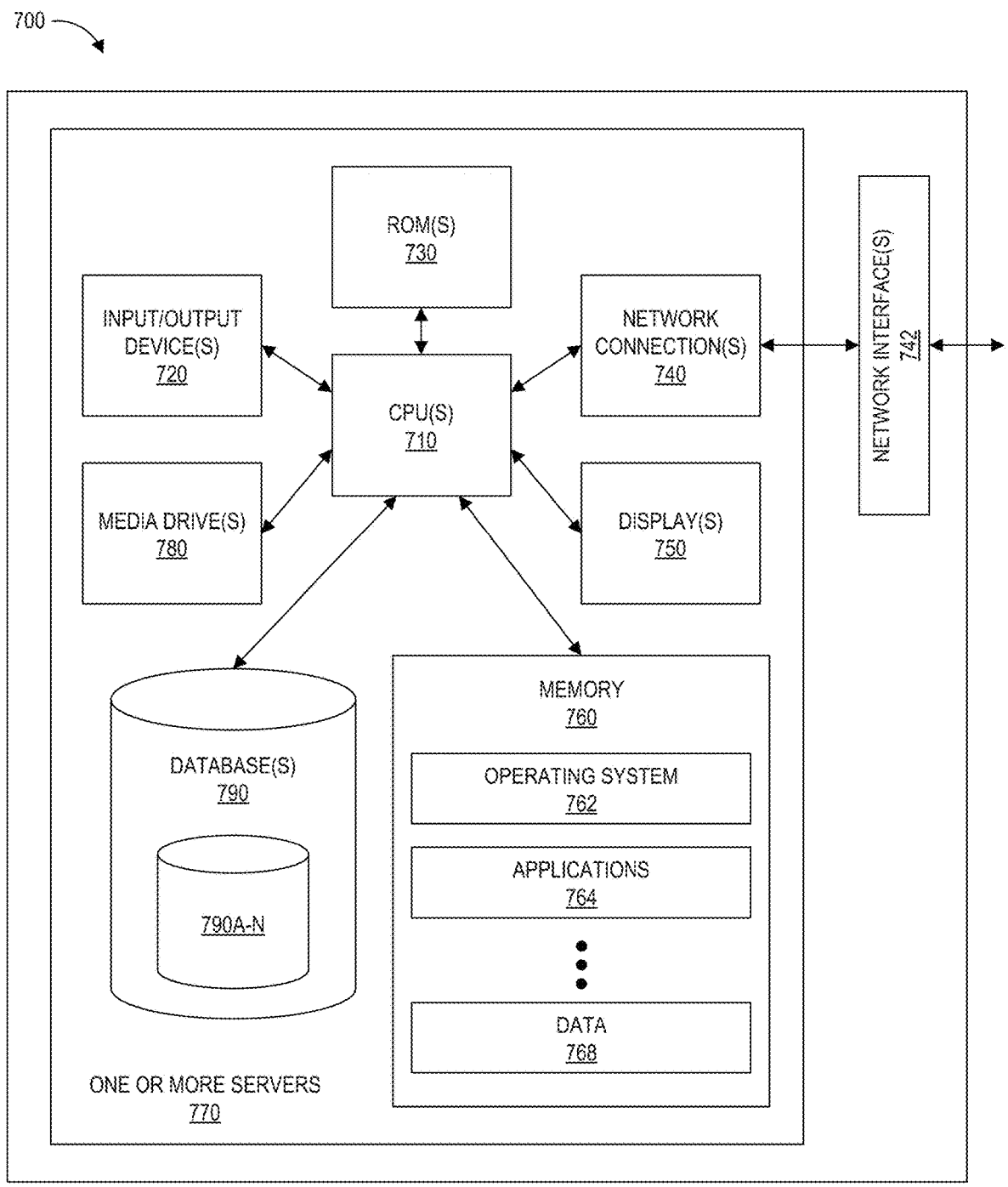
FIG. 7 illustrates an example computer system configuration on which may be implemented various embodiments of systems and methods in accordance with the disclosure.

FIG. 7 illustrates a computer system 700 usable to implement one or more of the systems (for instance, the end user system 102A, 102B, the tag management user system 104, analytics system 130, the tag management system 140, the collection system 180) servers (for instance, the site server 110 or tag server 120), or services (for instance, the media content service 116) within the computing environment 100 of FIG. 1.

As shown in FIG. 7, the computer system 700 can include (i) one or more hardware processors (CPUs) 710, (ii) an input/output device(s) 720 configured to allow users to input and output information and interact with the computer system 700 as well as transfer and receive data, (iii) one or more read only memory (ROMs) devices 730 or equivalents to provide nonvolatile storage of data, programs, (iv) one or more displays 750 such as a computer monitor or other display device, (v) one more network connections 740 and associated network interfaces 742 configured to allow the system 700 to connect to other systems, servers or portable devices, as well as one or more memory spaces 760 and database(s) 790. Database(s) 790 may be further divided or distributed as one or more sub-databases 790a-790n, with the sub-databases storing feature or function specific information associated with a particular feature or function. The various components shown in FIG. 7 may be incorporated in server(s) 770. It is noted that the various components shown in FIG. 7, including database(s) 790, are typically included as part of server(s) 770, however, they may be external to server(s) 770 in some embodiments. For example, database(s) 790 may be external to server(s) 770 and may be part of a separate database server system or networked database system. In some instances, the system may not be a server but rather a computing device like a desktop computer or mobile device.

One or more memory spaces 760 may comprise DRAM, SRAM, FLASH, hard disk drives or other memory storage devices, such as media drives 780, configured to store operating systems 762, application programs or data 764, and one or more memory spaces 760 may be shared with, distributed with or overlap with the memory storage capacity of database(s) 790. In some embodiments, one or more memory spaces 760 may include database(s) 790 or in some embodiments database(s) 790 may include data 768 as shown in memory space 760. Data stored in memory space 760 or database(s) 790 may include information, such as tag management system information or other types of data described herein.

VI. Additional Embodiments and Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines or computing systems that can function together.

While the present disclosure sometimes discusses engagement tracking in the video playback context, the embodiments, systems, methods, and non-transitory computer readable media described herein may be applied to engagement tracking regarding the playback of any type of media content. Example media content can include, but is not limited to, audio files or video files, such as podcasts, news programs, musical works, television programs, video clips, movies, or other multimedia content. Further, while the present disclosure often discusses advantages of abandonment-based engagement tracking as including reduced computer and network resource usage, other embodiments of systems, methods, and non-transitory computer readable media described herein may not necessarily result in reduced computer or network usage and may have other advantages, as described herein.

In some embodiments, one or more parts of or all of the analytics system 130 or tag server 120 can be implemented in a distributed cloud platform that provides redundant or geographically dispersed access. Although not illustrated herein, one such example implementation is described and illustrated with respect to FIG. 25 of U.S. Pat. No. 8,805,946, titled "SYSTEM AND METHOD FOR COMBINING CONTENT SITE VISITOR PROFILES," which was previously incorporated by reference herein in its entirety.

Although the network 108 is shown as one connected network, the network 108 can be subdivided into one or more separate networks which may not directly communicate with one another. For example, the analytics system 130 can communicate with the tag management user system 104 via a separate and different network from the network that the tag server 120 uses to communicate with the end user system 102A, 102B.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A hardware processor can include electrical circuitry or digital logic circuitry configured to process computer-executable instructions. In another embodiment, a processor includes an FPGA, other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others.

What is claimed is:

1. A method comprising:
   under control of a physical computing device comprising one or more hardware processors:
   detecting, in a media player of the physical computing device, a playback of media content;
   activating a listener configured to receive one or more events from the physical computing device;
   receiving, from the listener, a first event generated by the physical computing device;
   determining that the first event matches one or more abandonment indicators by comparing the first event to each indicator type of a plurality of abandonment indicator types;
   enabling a heartbeat tracking mode of the playback of the media content;
   transmitting, to a server, a first tracking message comprising a first playback position of the media content;
   determining that a second event matching the one or more abandonment indicators has not been received within a threshold period of elapsed time from receiving the first event; and in response to determining that the second event matching the one or more abandonment indicators has not been received within the threshold period of elapsed time, enabling a tracking suppression mode that suppresses transmitting of tracking messages by the physical computing device.

2. The method of claim 1, wherein the plurality of abandonment indicator types comprises at least two of: movement of the physical computing device, a keystroke, touch input, voice input, button selection, or interaction with an application.

3. The method of claim 1, further comprising:
in response to enabling the heartbeat tracking mode, transmitting, to the server, a plurality of tracking messages,
wherein each tracking message of the plurality of tracking messages comprises a playback position of the media content,
wherein transmitting the first tracking message is in response to enabling the heartbeat tracking mode.

4. The method of claim 3, wherein transmitting the plurality of tracking messages comprises:
transmitting a second tracking message of the plurality of tracking messages after a time interval has elapsed.

5. The method of claim 4, wherein the time interval is a predetermined amount of time.

6. The method of claim 4, further comprising:
determining a duration of time of the media content, wherein the duration of time is a remaining amount of time for the playback of the media content; and
calculating the time interval from a percentage value and the duration of time.

7. The method of claim 1, wherein enabling the tracking suppression mode comprises:
lowering a rate of transmitting the tracking messages.

8. A system comprising:
non-transitory physical computer storage; and
a computer hardware processor in a physical computing device, the computer hardware processor being in communication with the non-transitory physical computer storage and configured to:
detect a playback of media content;
activate a listener configured to receive one or more events from the physical computing device;
receive, from the listener, a first event generated by the physical computing device;
determine that the first event matches one or more abandonment indicators by comparing the first event to each indicator type of a plurality of abandonment indicator types;
enable a heartbeat tracking mode of the playback of the media content;
transmit, to a server, a first tracking message comprising a first playback position of the media content;
determine that a second event matching the one or more abandonment indicators has not been received within a threshold period of elapsed time from receiving the first event; and
in response to determining that the second event matching the one or more abandonment indicators has not been received within the threshold period of elapsed time, enable a tracking suppression mode that suppresses transmitting of second tracking messages by the physical computing device.

9. The system of claim 8, wherein the computer hardware processor is further configured to:
in response to enabling the heartbeat tracking mode, set a rate at which tracking messages are transmitted to a first rate.

10. The system of claim 9, wherein the computer hardware processor is further configured to:
in response to enabling the tracking suppression mode, set the rate at which the tracking messages are transmitted to a second rate.

11. The system of claim 10, wherein the computer hardware processor is further configured to:
detect the second event matching the one or more abandonment indicators;
in response to detecting the second event, enable the heartbeat tracking mode of the playback of the media content; and
in response to enabling the heartbeat tracking mode, set the rate at which the tracking messages are transmitted to the first rate.

12. The system of claim 8, wherein the computer hardware processor is further configured to:
in response to enabling the heartbeat tracking mode, transmit, to the server, a plurality of tracking messages,
wherein each tracking message of the plurality of tracking messages comprises a playback position of the media content,
wherein transmitting the first tracking message is in response to enabling the heartbeat tracking mode.

13. A method comprising:
under control of a physical computing device comprising one or more hardware processors:
detecting, in a media player of the physical computing device, a playback of media content;
activating a listener configured to receive one or more events from the physical computing device;
receiving, from the listener, a first event generated by the physical computing device;
determining that the first event matches one or more abandonment indicators by comparing the first event to each indicator type of a plurality of abandonment indicator types;
in response to determining that the first event matches the one or more abandonment indicators, enabling a heartbeat tracking mode of the playback of the media content, wherein the heartbeat tracking mode further comprises regularly transmitting, to a server, a plurality of tracking messages after a time interval has elapsed;
transmitting, to a server, a first tracking message of the plurality of tracking messages, the first tracking message comprising a first playback position of the media content;
determining that a second event matching the one or more abandonment indicators has not been received within a threshold period of elapsed time from receiving the first event; and
in response to determining that the second event matching the one or more abandonment indicators has not been received within the threshold period of elapsed time, enabling a tracking suppression mode that suppresses transmitting of tracking messages by the physical computing device.

14. The method of claim 13, further comprising:
in response to enabling the heartbeat tracking mode, transmitting, to the server, the plurality of tracking messages, wherein each tracking message of the plurality of tracking messages comprises a playback position of the media content, wherein transmitting the first tracking message is in response to enabling the heartbeat tracking mode.

15. The method of claim 14, wherein transmitting the plurality of tracking messages comprises:

transmitting a second tracking message of the plurality of tracking messages after a time interval has elapsed, wherein the time interval is a predetermined amount of time.

16. The method of claim 13, further comprising:

in response to enabling the heartbeat tracking mode, setting a rate at which the tracking messages are transmitted to a first rate.

17. The method of claim 16, further comprising:

in response to enabling the tracking suppression mode comprises, setting the rate at which the tracking messages are transmitted to a second rate.

18. The method of claim 17, further comprising:

detecting the second event matching the one or more abandonment indicators; and in response to detecting the second event, enabling the heartbeat tracking mode of the playback of the media content; and in response to enabling the heartbeat tracking mode, setting the rate at which the tracking messages are transmitted to the first rate.

* * * * *